(12) United States Patent
Durth et al.

(10) Patent No.: US 9,088,155 B2
(45) Date of Patent: Jul. 21, 2015

(54) SURGE PROTECTION DEVICE

(75) Inventors: Rainer Durth, Horn-Bad Meinberg (DE); Christian Depping, Lemgo (DE)

(73) Assignee: PHOENIX CONTACT GMBH & CO., KG, Blomberg (DE)

( * ) Notice: Subject to any disclaimer, the term of this patent is extended or adjusted under 35 U.S.C. 154(b) by 133 days.

(21) Appl. No.: 14/009,029

(22) PCT Filed: Apr. 2, 2012

(86) PCT No.: PCT/EP2012/001455
§ 371 (c)(1),
(2), (4) Date: Dec. 11, 2013

(87) PCT Pub. No.: WO2012/130477
PCT Pub. Date: Oct. 4, 2012

(65) Prior Publication Data
US 2014/0133057 A1    May 15, 2014

(30) Foreign Application Priority Data

Apr. 1, 2011    (DE) .......................... 10 2011 001 734

(51) Int. Cl.
*H02H 3/00*    (2006.01)
*H02H 3/08*    (2006.01)
(Continued)

(52) U.S. Cl.
CPC ................ *H02H 3/08* (2013.01); *H01H 79/00* (2013.01); *H01H 85/44* (2013.01); *H01T 1/14* (2013.01); *H01T 4/12* (2013.01); *H02H 9/06* (2013.01); *H01H 85/30* (2013.01); *H01H 85/46* (2013.01)

(58) Field of Classification Search
USPC ............................................. 361/8, 117–120
See application file for complete search history.

(56) References Cited

U.S. PATENT DOCUMENTS 3,755,715 A    8/1973    Klayum et al.
4,307,369 A    12/1981    Jackson
(Continued)

FOREIGN PATENT DOCUMENTS

CN    1613171 A    5/2005
CN    101036275 A    9/2007
(Continued)

OTHER PUBLICATIONS

International Search Report dated Dec. 4, 2012 corresponding to PCT/EP2012/001455 with English translation, 6 pp.
(Continued)

*Primary Examiner* — Danny Nguyen
(74) *Attorney, Agent, or Firm* — Ohlandt, Greeley, Ruggiero & Perle, LLP (57) ABSTRACT

There is provided a surge protection device that includes (a) an input and an output, (b) a short-circuit-proof primary current path and a secondary current path between the input and the output, and (c) a fuse in a short-circuit-proof fuse box. The short-circuit-proof fuse box is arranged in the secondary current path, and (i) on one side of the secondary current path is contacted with the primary current path in a short-circuit-proof manner based on the primary current path, and (ii) on the other side of the secondary current path is contacted in a substantially short-circuit-proof manner based on the fuse. A help system for signalling and/or supply of devices for improving ignition behavior is arranged in the secondary current path, and the short-circuit-proof fuse box is also contacted to a short-circuit-proof discharge path so that a current can be guided by the help system current path.

13 Claims, 7 Drawing Sheets

(51) Int. Cl.

| | |
|---|---|
| *H01H 85/44* | (2006.01) |
| *H01T 1/14* | (2006.01) |
| *H01T 4/12* | (2006.01) |
| *H02H 9/06* | (2006.01) |
| *H01H 79/00* | (2006.01) |
| *H01H 85/30* | (2006.01) |
| *H01H 85/46* | (2006.01) |

(56) References Cited

U.S. PATENT DOCUMENTS

| | | | | |
|---|---|---|---|---|
| 4,342,978 | A | * | 8/1982 | Meister ............... 337/6 |
| 4,516,182 | A | * | 5/1985 | Franklin ............ 361/13 |
| 2005/0041349 | A1 | | 2/2005 | Birkholz et al. |
| 2009/0021881 | A1 | | 1/2009 | Crevenat |
| 2009/0154044 | A1 | | 6/2009 | Crevenat |

FOREIGN PATENT DOCUMENTS

| | | |
|---|---|---|
| DE | 102007015364 A1 | 6/2008 |
| DE | 102008013447 A1 | 9/2009 |
| WO | 2008069870 A1 | 6/2008 |

OTHER PUBLICATIONS

Written Opinion of the International Searching Authority dated Deoembei 4, 2012 corresponding to PCT/EP2012/001455 with English translation, 8 pp.

International Preliminary Report cin Patentability dated Oct. 2, 2013 corresponding to PCT/EP2012/001455 with English translation, 10 pp.

Chinese Office Action dated Dec. 23, 2014 for corresponding Chinese Patent Application No. 201280017370.5 with English translation, 10 pp.

German Office Action dated Mar. 7, 2012 for corresponding German Patent Application No. 102011001734.8, 6 pp.

* cited by examiner

SURGE PROTECTION DEVICE

BACKGROUND OF THE DISCLOSURE

1. Field of the Disclosure

The invention relates to a surge protection device.

Surge protection devices (SPDs) in particular for the class I range are typically operated in very powerful supply systems. These surge protection devices (SPDs), in the event of an excessive voltage, shunt the current at the devices to be protected, that is to say an arrester is activated.

Pre-fuses, for example low-voltage HBC fuses of type NH01 to NH03, are arranged upstream of the surge protection devices.

The upstream fuses are either installed in the branch to the arrester, that is to say protect only the arrester itself, or are the upstream fuses of the overall system in which the surge protection device is operated.

2. Description of the Related Art

Surge protection devices often contain a number of parallel current paths.

These paths are usually at least one primary discharge current path and one or more secondary or auxiliary current paths.

The primary discharge current paths are intended to conduct the excessive voltages and current pulses and are therefore designed so as to be stable, that is to say with large cross sections.

The secondary current paths, which are used for example for signalling or for the supply of devices for improving the ignition behaviour of SPDs (in particular spark gaps, triggers of spark gaps and the like) and/or for signalling and/or measurement, are generally designed with much smaller conductor cross sections. The supplied devices are not generally short-circuit-proof.

These cross sections are therefore often not short-circuit-proof or overload-proof in the sense of the upstream fuses.

These current paths are therefore to be protected via separate fuses.

Due to the generally limited installation space within surge protection devices, fuses of small size are selected (for example microfuses).

These fuses in the secondary current path do not have the same quenching capability however as the fuses arranged upstream of the surge protection device.

Fuses in the secondary current path are therefore at risk of being destroyed. If these fuses in the secondary path are destroyed, either the entire surge protection device is to be replaced or at least the fuses in the secondary path. This is an involved process, but is also costly in terms of material and time.

SUMMARY OF THE DISCLOSURE

The object of the invention is to provide a surge protection device that, in the secondary current path, provides a fuse protection with sufficient quenching capability and additionally has a small size of the fuse protection in the secondary current path.

The object is achieved in accordance with the invention by the features of the independent claims. Advantageous embodiments of the invention are specified in the dependent claims.

The invention will be explained in greater detail hereinafter with reference to the accompanying drawings on the basis of preferred embodiments.

DESCRIPTION OF THE DISCLOSURE

Figure 1:
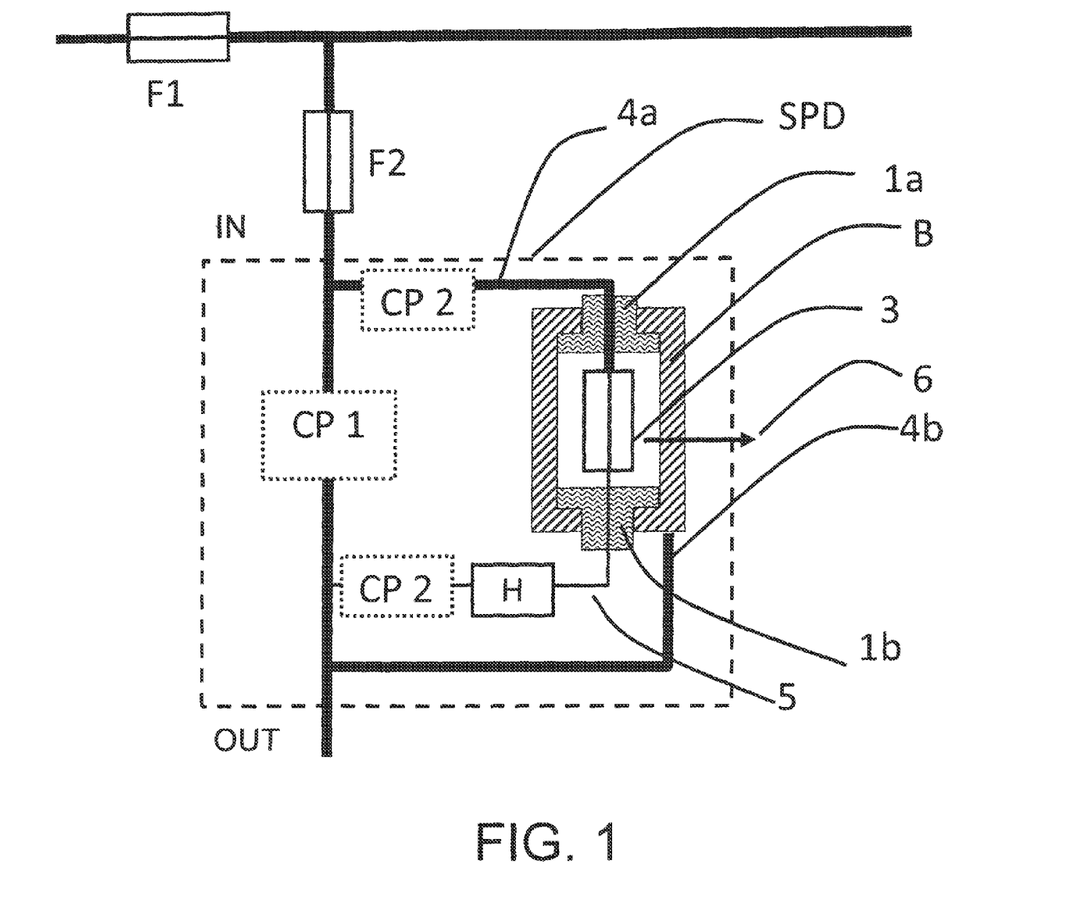
FIG. 1 shows a schematic overview of embodiments according to the invention.
Figure 2:
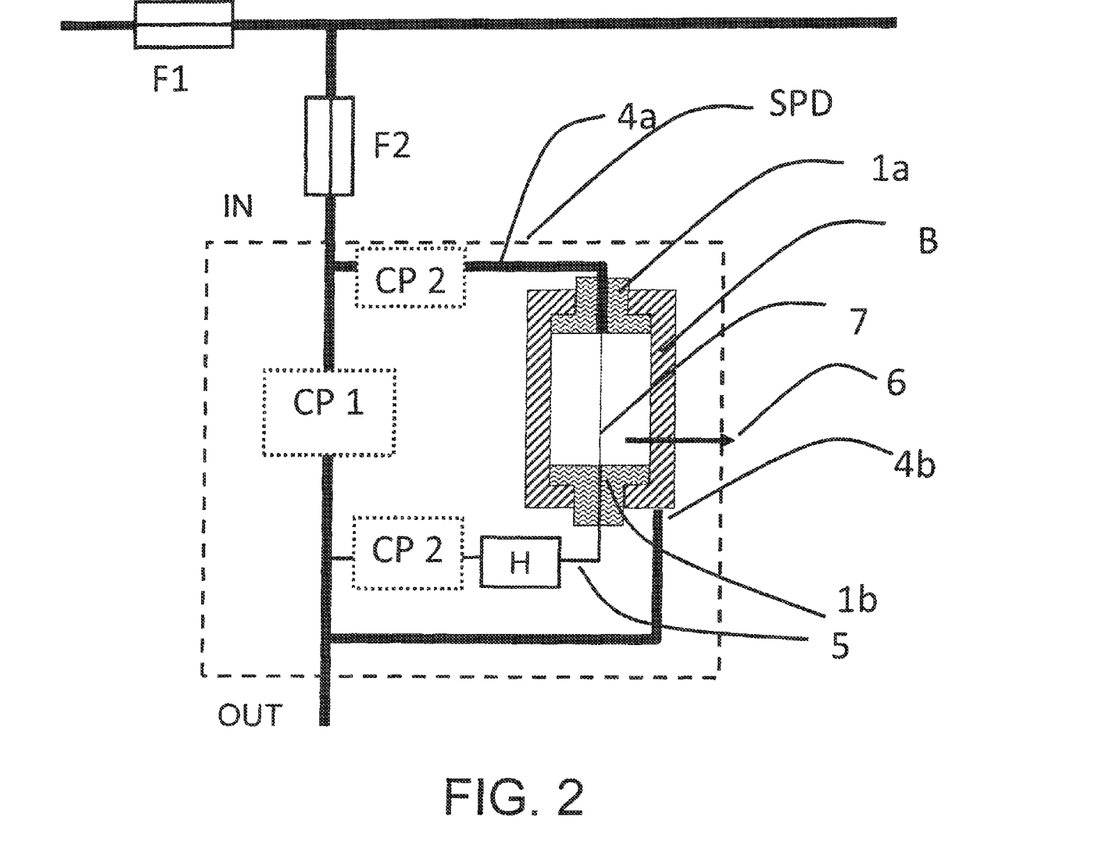
FIG. 2 shows a further schematic overview of embodiments according to the invention.
Figure 3:
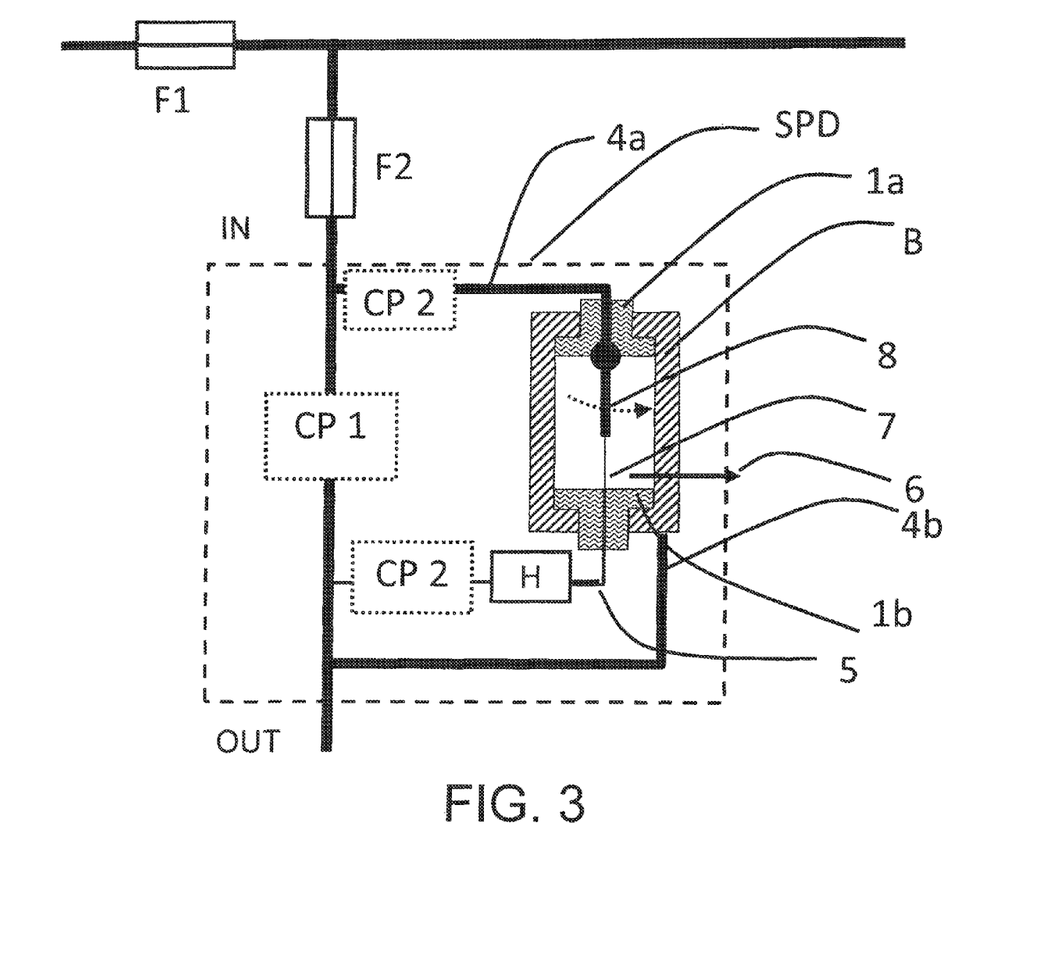
FIG. 3 shows a further schematic overview of embodiments according to the invention.

FIGS. 1, 2 and 3 show schematic embodiments according to the invention. These will be described hereinafter, wherein like, similar or functionally like component parts are generally referenced by like reference signs.

These embodiments of a surge protection device SPD are used, for example, in highly short-circuit-proof microfuse arrangements, in particular to safeguard ignition circuits at spark gaps.

The invention will be explained in greater detail hereinafter on the basis of this possible application. It is understood however that this description is not to be interpreted as limiting.

The surge protection device SPD is arranged between the supply lines of an installation or an electrical device. In this regard, an input side and an output side are defined, wherein the input side is arranged on the side facing towards the supply system and the output side is arranged on the side facing towards the installation or the electrical device.

An upstream fuse F2 can then be installed in the branch to the surge protection device SPD.

This upstream fuse F2 protects the surge protection device SPD itself.

Alternatively or additionally to the upstream fuse F2, an upstream fuse F1 may also be provided, which is arranged between the input side and the branch to the surge protection device SPD and therefore also between the output side. In this regard, the entire system in which the surge protection device is operated is protected by the upstream fuse F1.

The upstream fuses F1 and/or F2 may also be part of the surge protection device SPD, where they can be arranged in a fixed or exchangeable manner.

The surge protection device SPD has an input IN and an output OUT.

A primary current path or a plurality of primary current paths CP1 can be arranged between the input IN and the output OUT. Merely one primary current path CP1 will be presented hereinafter, although this is in no way limiting.

Furthermore, a secondary current path or a plurality of secondary current paths CP2 can be arranged between the input IN and the output OUT. Merely one secondary current path CP2 will be presented hereinafter, although this is in no way limiting.

A help system H is arranged in the secondary current path CP2.

This help system is intended for example to provide a signalling and/or remote action and/or measurement and/or is suitably equipped to provide a supply, for example for improving the ignition behaviour of a spark gap, triggers of spark gaps and the like.

For example, a spark gap can be arranged in the primary current path CP1 and can be ignited or an ignition triggered by means of a help system in the secondary current path.

Furthermore, the surge protection device SPD comprises a fuse 3, 7 in a short-circuit-proof fuse box.

The fuse generally has a comparatively low switching capability.

The fuse box B provides a small, short-circuit-proof installation volume.

The fuse box B is arranged in a secondary path CP2 beside a primary current path CP1 of a surge protection device SPD.

The fuse box B has two potentials isolated from one another.

Here, the feed line 4*a* is short-circuit-proof, at least as far as one of the two potentials of the fuse box B, in the sense of the short-circuit strength of the upstream fuses F1 and/or F2.

The fuse 3, 7 may have substantially a comparatively low switching capability.

This fuse 3, 7 is contacted on one side within the fuse box B to one short-circuit-proof potential of the installation volume.

The other pole of the fuse 3, 7 is guided from the fuse box B in an insulated manner 1*b* and is contacted with one or more of the auxiliary current paths 5 and therefore with the help system H. The auxiliary current path 5 is not short-circuit-proof in the sense of the short-circuit strength of an upstream fuse F1 and/or F2.

The fuse 3, 7 can be dimensioned here merely such that the following auxiliary current paths 5 are safeguarded, such that the auxiliary current path 5 is short-circuit-proof or overload-proof in the sense of the upstream fuse 3, 7.

For example, the fuse 3 may be a microfuse.

Furthermore, the short-circuit-proof fuse box B is contacted with a short-circuit-proof discharge path 4*b*, which can guide a current by the help system current path 5.

This property can be used in the event of overload of the fuse 3, 7.

If, in the event of overload, the fuse 3, 7 is triggered or destroyed, a resultant ionisation of (at least) parts of the fuse 3, 7 or of the short-circuit-proof housing B leads to a low-impedance short circuit, for example an arc, between the feed line 4*a* and (the inner wall of) the short-circuit-proof fuse box B for example, such that a short-circuit current is passed by the help system H via the short-circuit-proof discharge path 4*b*.

The help system H and/or the wiring 5 not short-circuit-proof are thus protected.

The quenching capability of the fuse 3, 7 within the fuse box B can additionally be set differently by means of suitable measures.

By way of example, a sand filling may be provided and/or a fusing conductor may be provided, which is formed suitably. Furthermore, the housing can be suitably formed or produced from specific material. Due to these variants, which may be provided individually or in combination, the quenching capability is influenced suitably.

It is also possible however to arrange the fusing conductor 7 of the fuse 3 in the fuse box B without further measures.

In the event of overload of the auxiliary current paths, the fuse 3, 7 is triggered. Here, the overcurrent is quenched automatically by the fuse 3, 7 in accordance with the set quenching capability.

If the inherent quenching capability of the fuse 3, 7 is insufficient or if no inherent quenching capability is provided, the fuse 3, 7 is destroyed irreversibly by the energy input.

In this case, a short circuit is triggered in the fuse box B, such that the current across the current path 4*a* is conducted to the current path 4*b*. This case is also referred to as short-circuit breaking.

The current then flowing is generally high and leads to a reliable triggering of the fuses F1 and/or F2 arranged upstream of the surge protection device SPD.

The short circuit generated within the fuse box B can be caused in different ways.

For example, it is possible, as illustrated in FIG. 3, to provide a mechanical arrangement, which, when triggered, produces a short circuit to the fuse box B.

This can occur for example by a combination of a short-circuiting switch 8 with a fusing conductor 7.

Here, the fusing conductor 7 and the short-circuiting switch 8 are arranged in such a way that, in a first biased position (as illustrated in FIG. 3), the contact to the secondary current path 5 is provided.

If the current rises and exceeds a specific threshold, the fusing conductor 7 melts, wherein the fusing conductor 7 then releases the mechanical biased short-circuiting switch 8, which is then moved by the previously provided bias into a second position and produces a short circuit with the fuse box B and the discharge path 4*b*.

Furthermore, the short circuit can also be generated by an arc. Such an arc can be produced for example in that, in the event of a failure of the fuse 3, 7, an arc can be created by ionised gases. A relevant inherent quenching capability of the fuse 3, 7 may also be omitted, such that each triggering of the fuse 3, 7 results in a short circuit in the fuse box B.

To this end, the fusing conductor 7 of the fuse can be arranged merely in an insulated manner at the bushings (1*a*, 1*b*), without further modification, as illustrated in FIG. 2, in the fuse box B.

Furthermore, the fuse box B can consist of different metal or non-metal electrically conductive materials and can have different mechanical embodiments.

Figure 4:
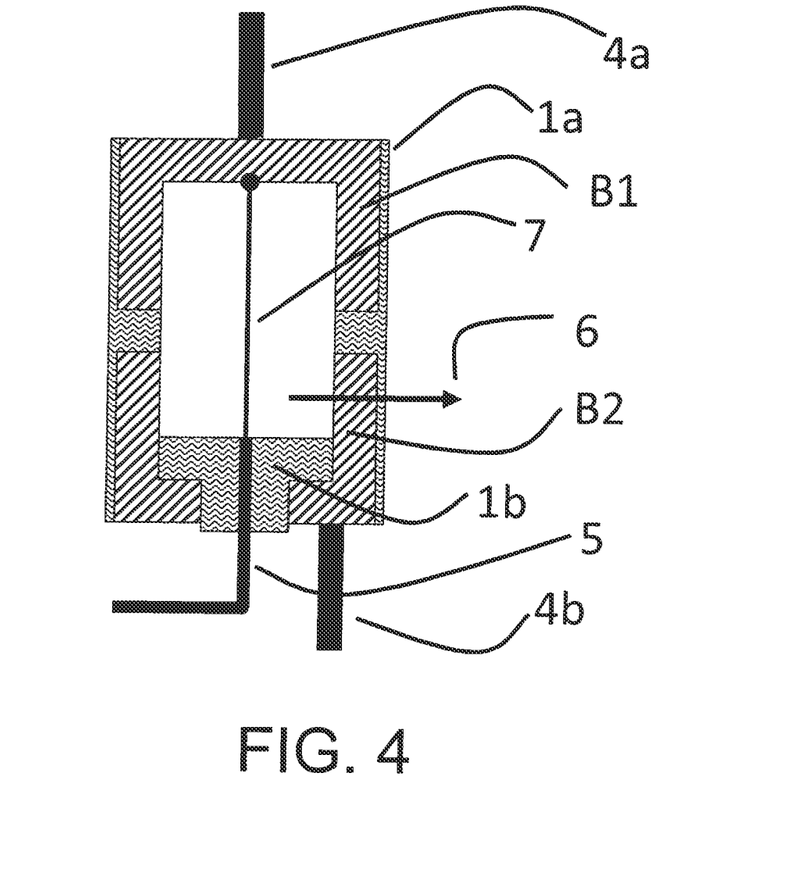
FIG. 4 shows a detailed view of an embodiment according to the invention.

As can be illustrated in FIG. 4, the two potentials isolated from one another for example can be formed as two half-shells of a fuse box B.

The half-shells B1, B2 are conductive, for example are made of metal, and are separated from one another by an insulation 1*a*.

The upper half-shell B1 is connectable to the discharge path 4*a*.

The lower half-shell B2 has an insulation 1*b*. A fusing conductor 7 or a fuse 3 can be connected to a secondary current path 5 through this insulation 1*b*.

Furthermore, the lower half-shell B2 is also connectable to the discharge path 4*b*.

Figure 5:
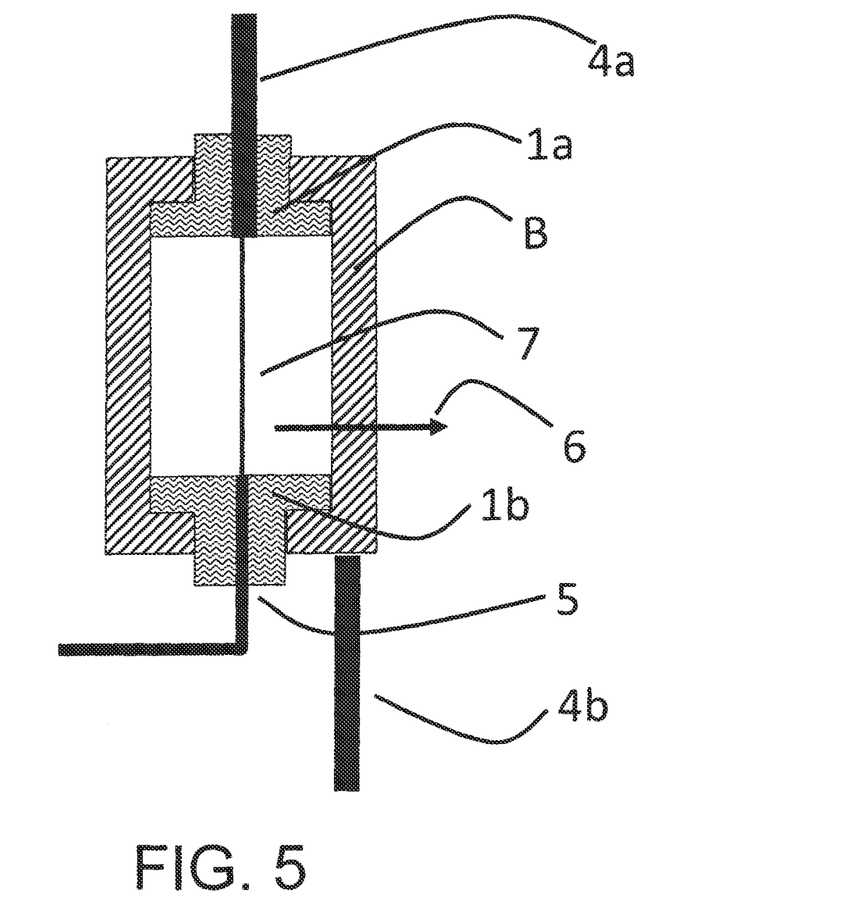
FIG. 5 shows a further detailed view of an embodiment according to the invention.

As illustrated in FIG. 5, the housing of the fuse box B itself may form one potential.

The case in which the housing of the fuse box B is conductive, for example made of metal, is also illustrated. The housing of the fuse box B is connectable to the discharge path 4*b*.

Two insulating inserts 1*a*, 1*b* are arranged in a substantially mutually opposed manner in the housing.

A fusing conductor 7 or a fuse 3 is connectable to a discharge path 4*a* through the insulation 1*a* on the upper face.

The fusing conductor 7 or the fuse 3 is connectable to a discharge path 4*a* through the insulation 1*b* on the lower face.

Here, the electrical contact that is guided through the insulation 1*a* on the upper face forms the other potential.

In order to generate a particularly high switching capability, it may be advantageous to form the entire fuse box B or portions thereof with arc-resistant materials, for example copper-tungsten.

Figure 6:
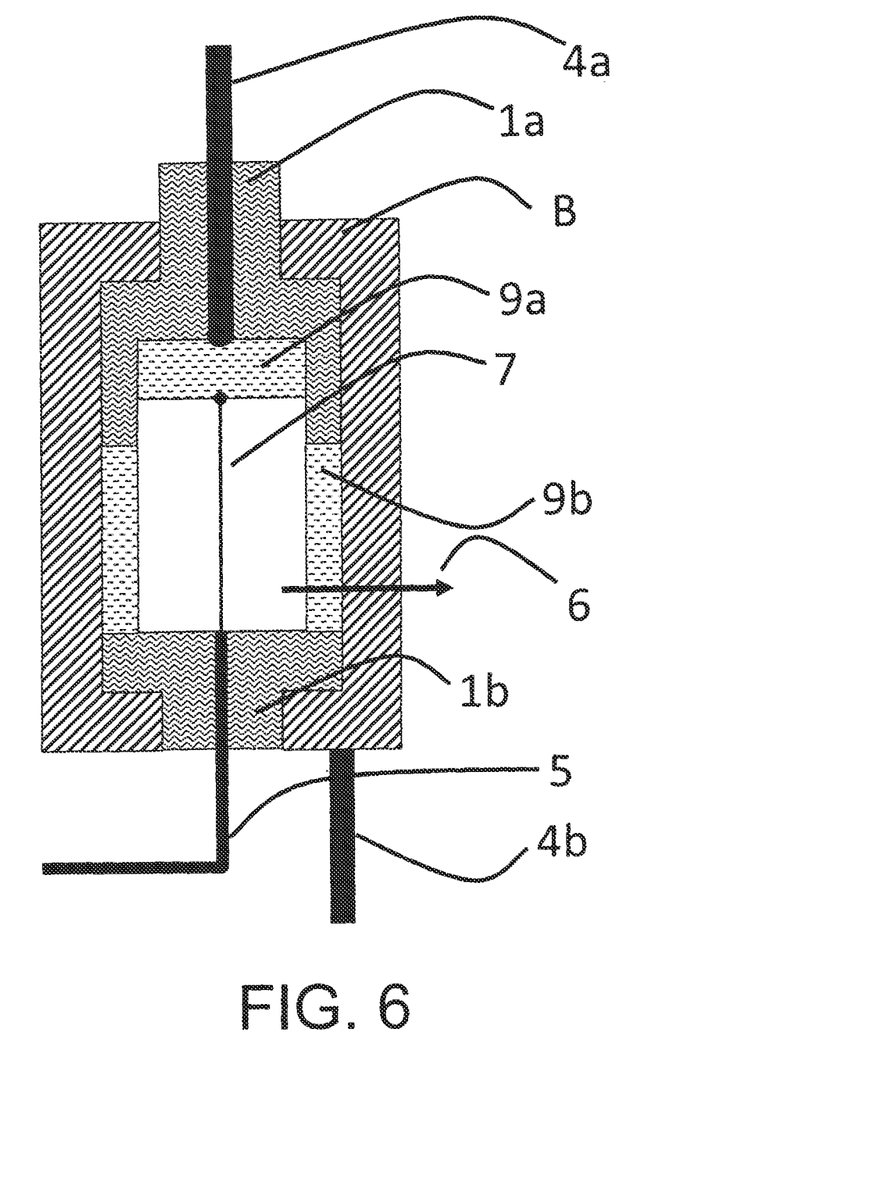
FIG. 6 shows a further detailed view of an embodiment according to the invention.

This possibility is illustrated in FIG. 6. There, arc-resistant material is arranged inside the fuse box B at various points.

It is thus possible for example to arrange arc-resistant material 9b on the surrounding wall of the fuse box B. Alternatively or additionally, it is possible to arrange arc-resistant material 9a on one of the insulations, in the illustrated case on the insulation 1a, B.

Figure 7:
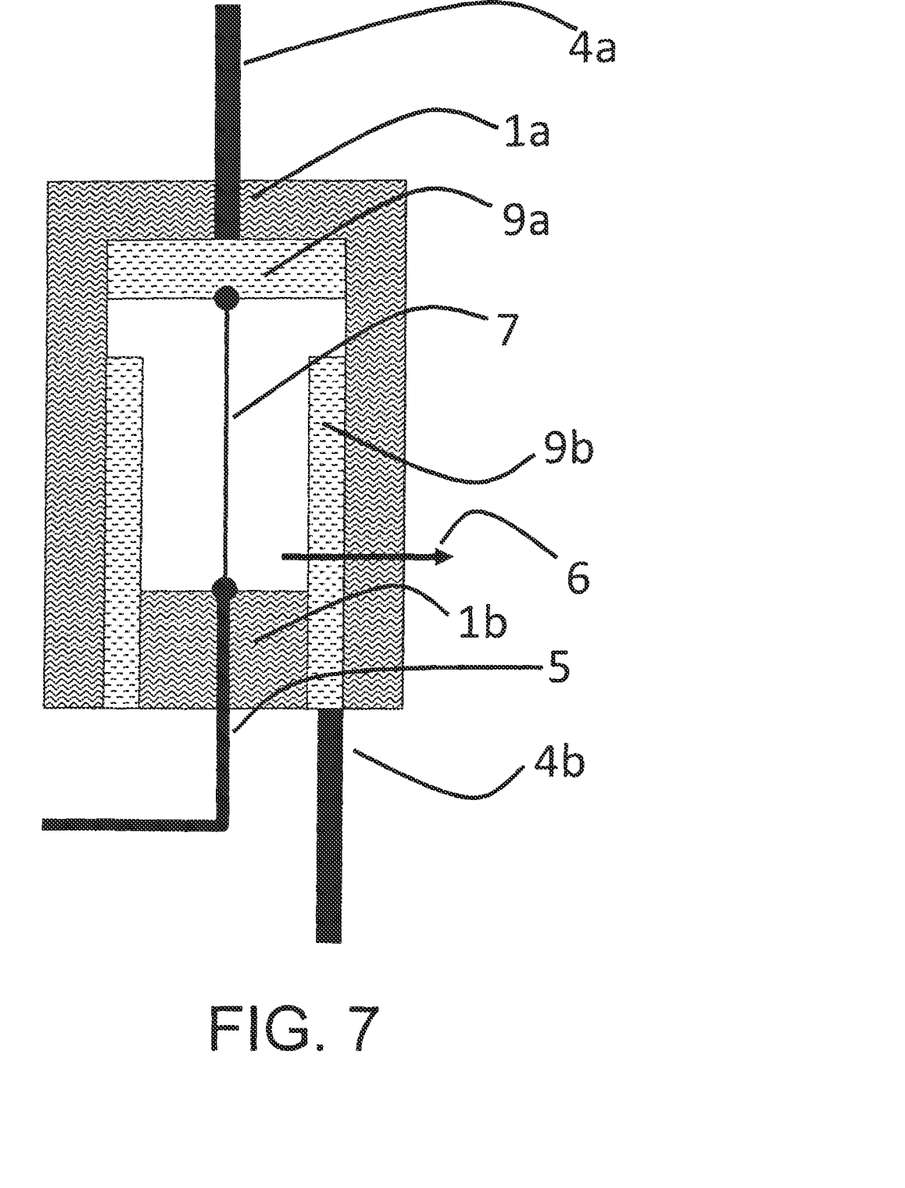
FIG. 7 shows yet a further detailed view of an embodiment according to the invention.

Furthermore, with a suitable embodiment as shown in FIG. 7, the fuse box B can be formed substantially from an insulating material 1a.

In this, a contacting to the inner region for the arrester 4a is provided. Furthermore, a contacting to the inner region for the auxiliary current conductor 5 is provided in an insulating portion 1b. A fuse 3, 7 can be introduced between the two contactings.

Furthermore, an electrically conductive portion 9b can be arranged as part of the fuse box B or the fuse 3, 7 and provides a contacting to the inner region for the arrester 4b.

If specific regions are provided for the burning of the arc, the housing which generates the mechanical strength can also be made from an insulating material that preferably simultaneously forms the insulated bushings.

The surge protection device SPD is preferably formed such that the fuse 3, 7 and the fuse box B are formed as one structural unit, wherein the structural unit is arranged exchangeably in the surge protection device SPD.

It is also preferable if the surge protection device SPD has a signalling device 6, which signals the state of the fuse (3) electrically and/or optically and/or acoustically.

This signalling device 6 can be provided alternatively or additionally to a signalling device arranged in a secondary current path CP2.

It is also preferable if the surge protection device SPD is designed such that the short-circuit strength of the surge protection device for class I operation is met.

LIST OF REFERENCE SIGNS surge protection device SPD
input IN
output OUT
primary current path CP1
secondary current path CP2
help system
fuse box B, B1, B2
insulation, insulating material 1a, 1b
fuse 3
discharge path 4a, 4b
pre-fuse F1, F2
help system current path 5
signalling device 6
fusing conductor 7
short-circuiting switch 8
arc-resistant material 9a, 9b

The invention claimed is:

1. A surge protection device comprising:
an input and an output;
a short-circuit-proof primary current path and a secondary current path between the input and the output; and
a fuse in a short-circuit-proof fuse box,
wherein the short-circuit-proof fuse box is arranged in the secondary current path, and (i) on one side of the secondary current path is contacted with the primary current path in a short-circuit-proof manner based on the primary current path, and (ii) on the other side of the secondary current path is contacted in a substantially short-circuit-proof manner based on the fuse,
wherein a help system for signalling and/or supply of devices for improving ignition behaviour is arranged in the secondary current path, and
wherein the short-circuit-proof fuse box is also contacted to a short-circuit-proof discharge path so that a current can be guided by the help system current path.

2. The surge protection device according to claim 1, wherein, in the event of a short circuit of the fuse, the current across the secondary current path is conducted to the short-circuit-proof discharge path and is thus guided by the help system.

3. The surge protection device according to claim 1, wherein the fuse comprises a fusing conductor.

4. The surge protection device according to claim 1, wherein the discharge path is activated by a mechanical switch (8) by the fuse in the fuse box.

5. The surge protection device according to claim 1, wherein in that the short circuit to the discharge path is activated by an arc by the triggering of the fuse in the fuse box.

6. The surge protection device according to claim 1, wherein the fuse box is made of metal in portions.

7. The surge protection device according to claim 1, wherein the fuse box comprises an arc-resistant material, at least in portions.

8. The surge protection device according to claim 1, wherein the fuse box comprises an insulating material, at least in portions.

9. The surge protection device according to claim 1, wherein the fuse has its own quenching capability.

10. The surge protection device according to claim 1, wherein the fuse comprises a sand filling.

11. The surge protection device according to claim 1, wherein the fuse and the fuse box are formed as a structural unit, which is arranged exchangeably in the surge protection device.

12. The surge protection device according to claim 1, wherein the surge protection device further has a signalling device, which signals the state of the fuse electrically and/or optically and/or acoustically.

13. The surge protection device according to claim 1, wherein the short-circuit strength of the surge protection device is designed for class I operation.

* * * * *